US012076668B2

(12) United States Patent
Kathan

(10) Patent No.: US 12,076,668 B2
(45) Date of Patent: Sep. 3, 2024

(54) FILTER WITH ELECTRICALLY-CONDUCTIVE WRAP

(71) Applicant: Pall Corporation, Port Washington, NY (US)

(72) Inventor: Kyle R. Kathan, New Port Richey, FL (US)

(73) Assignee: Pall Corporation, Port Washington, NY (US)

( * ) Notice: Subject to any disclaimer, the term of this patent is extended or adjusted under 35 U.S.C. 154(b) by 145 days.

(21) Appl. No.: 17/383,204

(22) Filed: Jul. 22, 2021

(65) Prior Publication Data
US 2023/0025622 A1    Jan. 26, 2023

(51) Int. Cl.
*B01D 39/20*    (2006.01)
*B01D 29/33*    (2006.01)
(Continued)

(52) U.S. Cl.
CPC ........... *B01D 29/333* (2013.01); *B01D 35/30* (2013.01); *B01D 39/2017* (2013.01);
(Continued)

(58) Field of Classification Search
CPC .. B01D 29/333; B01D 35/30; B01D 39/2017; B01D 46/0002; B01D 46/2411; B01D 46/521; B01D 2201/12; B01D 2201/291; B01D 2201/50; B01D 2239/0421; B01D 2239/0627; B01D 2239/0636; B01D 2239/064; B01D 2239/0668; B01D 2239/0677; B01D 2239/0681;
(Continued)

(56) References Cited

U.S. PATENT DOCUMENTS 3,933,643 A    1/1976    Colvin et al.
5,229,200 A    7/1993    Sassa et al.
(Continued)

FOREIGN PATENT DOCUMENTS

CL    2018-001666 A1    8/2018
CN    103764248 A    4/2014
(Continued)

OTHER PUBLICATIONS

Alexander et al., "A unifying approach to performance analysis in the Java environment," *IBM Systems Journal*, 39(1): 118-134 (2000).
(Continued)

*Primary Examiner* — Madeline Gonzalez
(74) *Attorney, Agent, or Firm* — Leydig, Voit & Mayer, Ltd.

(57) ABSTRACT

A filter for filtering particulates from a fluid stream includes a filter element, a first end cap, a second end cap, and a wrap. The end caps are respectively secured to the ends of the filter element to form a fluid tight seal therebetween. At least one of the end caps defines an opening therethrough in fluid communication with the interior passage of the filter element. The wrap is in the form of a strip secured to at least the filter element. The wrap comprises a conductive layer comprising an electrically-conductive material. The wrap is wrapped around the filter element such that at least forty percent of the outer surface area is covered by the conductive layer.

12 Claims, 6 Drawing Sheets

(51) Int. Cl.
    *B01D 35/30*    (2006.01)
    *B01D 46/00*    (2022.01)
    *B01D 46/24*    (2006.01)
    *B01D 46/52*    (2006.01)

(52) U.S. Cl.
CPC ...... *B01D 46/0002* (2013.01); *B01D 46/2411* (2013.01); *B01D 46/521* (2013.01); *B01D 2201/12* (2013.01); *B01D 2201/291* (2013.01); *B01D 2201/50* (2013.01)

(58) Field of Classification Search
CPC .............. B01D 39/083; B01D 39/2041; B01D 2239/0241; B01D 2239/0464; B01D 2239/0654; B01D 2239/0695; B01D 2239/1216; B01D 35/005; B01D 39/1623; B01D 39/1692; B01D 39/18; B01D 39/2082; B01D 29/15; B03C 3/51; B03C 3/64
USPC ........ 210/497.1, 493, 4, 493.1, 497.01, 490, 210/767, 243, 248, 487, 483, 493.2, 210/500.25, 500.26
See application file for complete search history.

(56) References Cited

U.S. PATENT DOCUMENTS

| | | | |
|---|---|---|---|
| 5,527,569 | A | 6/1996 | Hobson et al. |
| 5,543,047 | A | 8/1996 | Stoyell et al. |
| 6,167,535 | A | 12/2000 | Foote et al. |
| 6,324,631 | B1 | 11/2001 | Kuiper |
| 6,370,684 | B1 | 4/2002 | De Pauw et al. |
| 6,526,422 | B1 | 2/2003 | Flood et al. |
| 6,658,652 | B1 | 12/2003 | Alexander, III et al. |
| 7,162,605 | B2 | 1/2007 | Anchanta et al. |
| 8,182,682 | B1 | 5/2012 | Rajadhyaksha et al. |
| 9,744,484 | B2 | 8/2017 | Kathan et al. |
| 2003/0028741 | A1 | 2/2003 | Sokolov et al. |
| 2003/0212719 | A1 | 11/2003 | Yasuda et al. |
| 2004/0015850 | A1 | 1/2004 | Sokolov et al. |
| 2004/0111449 | A1 | 6/2004 | Garthwaite |
| 2005/0278497 | A1 | 12/2005 | Pliss et al. |
| 2007/0007218 | A1* | 1/2007 | Hundley ............ B01D 46/2414 210/243 |
| 2008/0308483 | A1 | 12/2008 | Hundley et al. |
| 2015/0375143 | A1* | 12/2015 | Kathan .............. B01D 46/0031 210/497.01 |

FOREIGN PATENT DOCUMENTS

| | | |
|---|---|---|
| JP | 2003-514652 A | 4/2003 |
| WO | WO 2001/037969 A1 | 5/2001 |
| WO | WO 2001/037970 A1 | 5/2001 |
| WO | WO 2018/235030 A1 | 12/2018 |

OTHER PUBLICATIONS

Dimpsey et al., "Java server performance: A case study of building efficient, scalable JVMS," *IBM Systems Journal*, 39(1): 151-174 (2000).

Pall Corporation, "Overcoming Electrostatic Charge Generation—Incorporating a Novel Filter Media," Technical White Paper, Pall Scientific & Laboratory Services, pp. 1-4 (May 2017).

Intellectual Property Office of Singapore, Search Report in Singaporean Patent Application No. 10202250522C (Apr. 14, 2023).

Japan Patent Office, Notice of Reasons for Rejection in Japanese Patent Application No. 2022-116414 (Jun. 13, 2023).

Chile Patent Office, Office Action in Chilean Patent Application No. 2022-01979 (Oct. 4, 2023).

Taiwan Patent Office, Office Action in Taiwan Patent Application No. 111127369 (Dec. 25, 2023).

* cited by examiner

FILTER WITH ELECTRICALLY-CONDUCTIVE WRAP

BACKGROUND OF THE INVENTION

Filter cartridges have a filter element for filtering particulates from a fluid stream. Filter elements subject to radially inward (outside-to-inside) fluid flow typically have an interior core and an exterior cage. Filter elements subject to radially outward (inside-to-outside) fluid flow may not require an interior core. Some filter cartridges use a helical wrap rather than a cage to secure the filter element in the filter and reduce weight and cost.

Conventional porous media used in filter cartridges is typically nonconductive. Treatment of non-conductive fluids, e.g., a non-polar hydrocarbon such as gasoline, by the use of porous media such as filter media housed in filter cartridges is known. Such fluid treatments can become difficult or challenging as a result of the buildup of triboelectric charges. The static charges tend to accumulate on the media. If the accumulated charges are not properly discharged, a spark may form with the possibility of igniting the fluid and creating conditions harmful to operators and property.

This problem has been recognized in many fields, e.g., processing of food materials such as flour, pumping coal dust or gasoline, and coating of textiles, and in the filtration industry. See, e.g., U.S. Pat. Nos. 3,933,643; 5,527,569; and 5,229,200. As high process rates are desired for economic reasons, the problem arising from the static charge build up can be significant at high fluid velocities and when porous media of small pore sizes are utilized in carrying out the processes.

Conventionally, triboelectric charging is addressed via conductive filter media or complex grounding systems. Attempts have been made to reduce such risks, for example, by using porous media made of metal cloth, fiber, or powders. However, the filtration efficiency and pore sizes of many of these media are limiting. These media are also expensive to manufacture. There is a continued need in the art to provide additional solutions to enhance the filtration of fluids under conditions which reduce the buildup of static or triboelectric charges.

It will be appreciated that this background description has been created by the inventor to aid the reader, and is not to be taken as an indication that any of the indicated problems were themselves appreciated in the art. While the described principles can, in some aspects and embodiments, alleviate the problems inherent in other systems, it will be appreciated that the scope of the protected innovation is defined by the attached claims, and not by the ability of any disclosed feature to solve any specific problem noted herein.

SUMMARY OF THE INVENTION

The present disclosure, in one aspect, is directed to embodiments of a filter. In embodiments, the filter can be used to filter particulates from a fluid stream having a conductivity less than 50 pS/m.

In one embodiment, a filter for filtering particulates from a fluid stream includes a filter element, a first end cap, a second end cap, and a wrap. The filter element extends along a longitudinal axis between a first end and a second end. The filter element has an inner surface defining an interior passage and an outer surface defining an outer surface area. The filter element includes a filter medium.

The first end cap and the second end cap are respectively secured to the first end and the second end of the filter element to form a fluid tight seal therebetween. At least one of the first end cap and the second end cap defines an opening therethrough in fluid communication with the interior passage of the filter element.

The wrap is secured to at least the filter element. The wrap comprises a strip having a wrap length and a wrap width. The wrap length is greater than the wrap width. The wrap comprises a conductive layer comprising an electrically-conductive material. The wrap is wrapped around the filter element such that at least forty percent of the outer surface area is covered by the conductive layer.

In another aspect, the present disclosure is directed to embodiments of a fluid filter assembly. In one embodiment, a fluid filter assembly for filtering particulates from a fluid stream includes a housing and a filter.

The housing defines a first port, a second port, and a filter chamber. The first port and the second port are in communication with the filter chamber such that a fluid flow path is defined between the first port and the second port through the filter chamber The filter includes a filter element, a first end cap, a second end, and a wrap. The filter element extends along a longitudinal axis between a first end and a second end. The filter element has an inner surface defining an interior passage and an outer surface defining an outer surface area. The filter element includes a filter medium.

The first end cap and the second end cap are respectively secured to the first end and the second end of the filter element to form a fluid tight seal therebetween. At least one of the first end cap and the second end cap defines an opening therethrough in fluid communication with the interior passage of the filter element.

The wrap is secured to at least the filter element. The wrap comprises a strip having a wrap length and a wrap width. The wrap length is greater than the wrap width. The wrap comprises a conductive layer comprising an electrically-conductive material. The wrap is wrapped around the filter element such that at least forty percent of the outer surface area is covered by the conductive layer.

The filter is positioned within the filter chamber of the housing such that the filter is interposed between the first port and the second port along the fluid flow path and such that the filter element is electrically connected to the housing.

In yet another aspect, the present disclosure is directed to embodiments of a method of using a filter. In one embodiment, a method of filtering particulates from a fluid stream includes passing the fluid stream through a filter element where the fluid stream has a conductivity less than 50 pS/m.

The filter element extends along a longitudinal axis between a first end and a second end. The filter element has an inner surface defining an interior passage and an outer surface defining an outer surface area.

A wrap is electrically connected to ground. The wrap is secured to at least the filter element. The wrap comprises a strip having a wrap length and a wrap width. The wrap length is greater than the wrap width. The wrap comprises a conductive layer comprising an electrically-conductive material. The wrap is wrapped around the filter element such that at least forty percent of the outer surface area is covered by the conductive layer.

Further and alternative aspects and features of the disclosed principles will be appreciated from the following detailed description and the accompanying drawings. As will be appreciated, the filters disclosed herein are capable of being carried out and used in other and different embodiments, and capable of being modified in various respects. Accordingly, it is to be understood that both the foregoing general description and the following detailed description are exemplary and explanatory only and do not restrict the scope of the appended claims.

Figure 1:
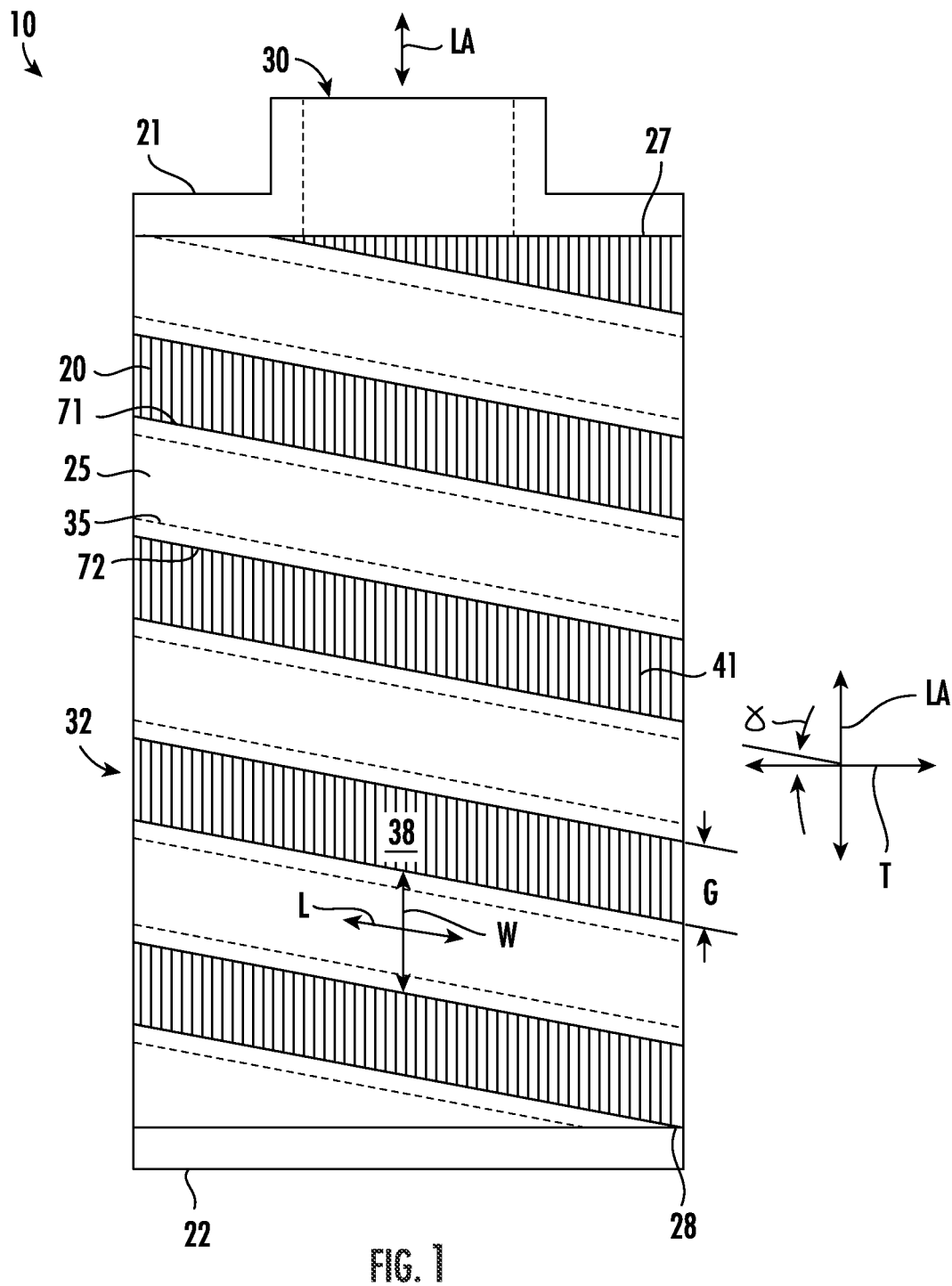
FIG. 1 is a side elevational view of an embodiment of a filter constructed in accordance with principles of the present disclosure.

It should be understood that the drawings are not necessarily to scale and that the disclosed embodiments are illustrated diagrammatically and in partial views. In certain instances, details which are not necessary for an understanding of this disclosure or which render other details difficult to perceive may have been omitted. It should be understood that this disclosure is not limited to the particular embodiments illustrated herein.

DETAILED DESCRIPTION OF THE INVENTION

Embodiments of a filter constructed in accordance with principles of the present disclosure are adapted to be used with embodiments of a filter assembly constructed in accordance with principles of the present disclosure for filtering particulates from a fluid stream. Embodiments of a filter assembly constructed in accordance with principles of the present disclosure can be used in embodiments of a method of using a filter following principles of the present disclosure.

Embodiments of a filter constructed in accordance with principles of the present disclosure can be used in biopharmaceutical environments, but can be used in other industrial applications where different fluids, solutions, reagents and/or chemicals are used. Embodiments of a filter constructed in accordance with principles of the present disclosure can be used to filter particulates from a fluid stream having a conductivity less than 50 pS/m. Embodiments of a filter constructed in accordance with principles of the present disclosure can be used to filter particulates from a fluid stream used in hydraulic or lubricant applications that are prone to generate triboelectric charging that causes static discharge.

Embodiments of a filter constructed in accordance with principles of the present disclosure are configured to dissipate triboelectric charging to reduce the incidence of electrostatic discharge. In embodiments of a filter constructed in accordance with principles of the present disclosure, the filter can include a filter element with a bonded conductive helical wrap. The helical wrap can comprise a single conductive layer or have a multi-layer construction, including at least one conductive layer and at least one carrier layer.

In embodiments of a filter constructed in accordance with principles of the present disclosure, the filter can include a filter element having filter media that is non-conductive. In embodiments, the filter media can be substantially free of conductive filter media. In embodiments, the filter media can have a gel resistance and/or dirt capacity greater than that of known conductive filter media.

It will be appreciated that this detailed description provides exemplary embodiments of the invention. Since other embodiments of the invention may differ in detail from the embodiments in this detailed description, the detailed description is intended to reference the particular embodiments being discussed at that point and is not intended to imply any limitation as to the scope of the invention more generally.

Turning now to the FIGURES, there is shown in FIG. 1 an embodiment of a filter 10 constructed in accordance with principles of the present disclosure. The filter 10 is configured to filter particulates from a fluid stream and includes a filter element 20, a first end cap 21, a second end cap 22, and a wrap 25.

The filter element 20 is cylindrical and is adapted to filter material in response to fluid flow therethrough. The first and second end caps 21, 22 (also referred to as "adapters") are respectively secured to a first axial end 27 and a second axial end 28 of the filter element 20 to form a fluid tight seal therebetween. The end caps 21, 22 respectively seal the ends 27, 28 of the filter element 20. In embodiments, at least one of the first end cap 21 and the second end cap 22 defines an opening 30 therethrough in fluid communication with an interior passage 31 of the filter element 20 (see FIG. 2). The wrap 25 is helically wrapped around an outer surface 32 of the filter element 20. The wrap 25 comprises a conductive layer 35 comprising an electrically-conductive material which is configured to help dissipate triboelectric charging and to reduce the incidence of electrostatic discharge. The filter 10 can be used to filter particulates from a fluid stream having a conductivity less than 50 pS/m, which is considered to be non-conductive.

The filter element 20 (also referred to as a "cylindrical pack") extends along a longitudinal axis LA between the first end 27 and the second end 28. The filter element 20 has an inner surface 37 defining the interior passage 31. The outer surface 32 of the filter element 20 defines an outer cylindrical surface area 38. One skilled in the art will appreciate that in other embodiments, the filter element 20 can have a different shape, including non-cylindrical shapes having a cross-section with an outer periphery that is non-circular, such as, oval, square, triangular, hexagonal, for example.

In embodiments, the filter element 20 comprises a plurality of longitudinal curved pleats 41 or radial pleats (not shown). Those skilled in the art will appreciate that the wrap 25 can be used in other embodiments of a filter including a non-pleated filter element, such as a hollow cylindrical mass of fibers, for example.

Figure 2:
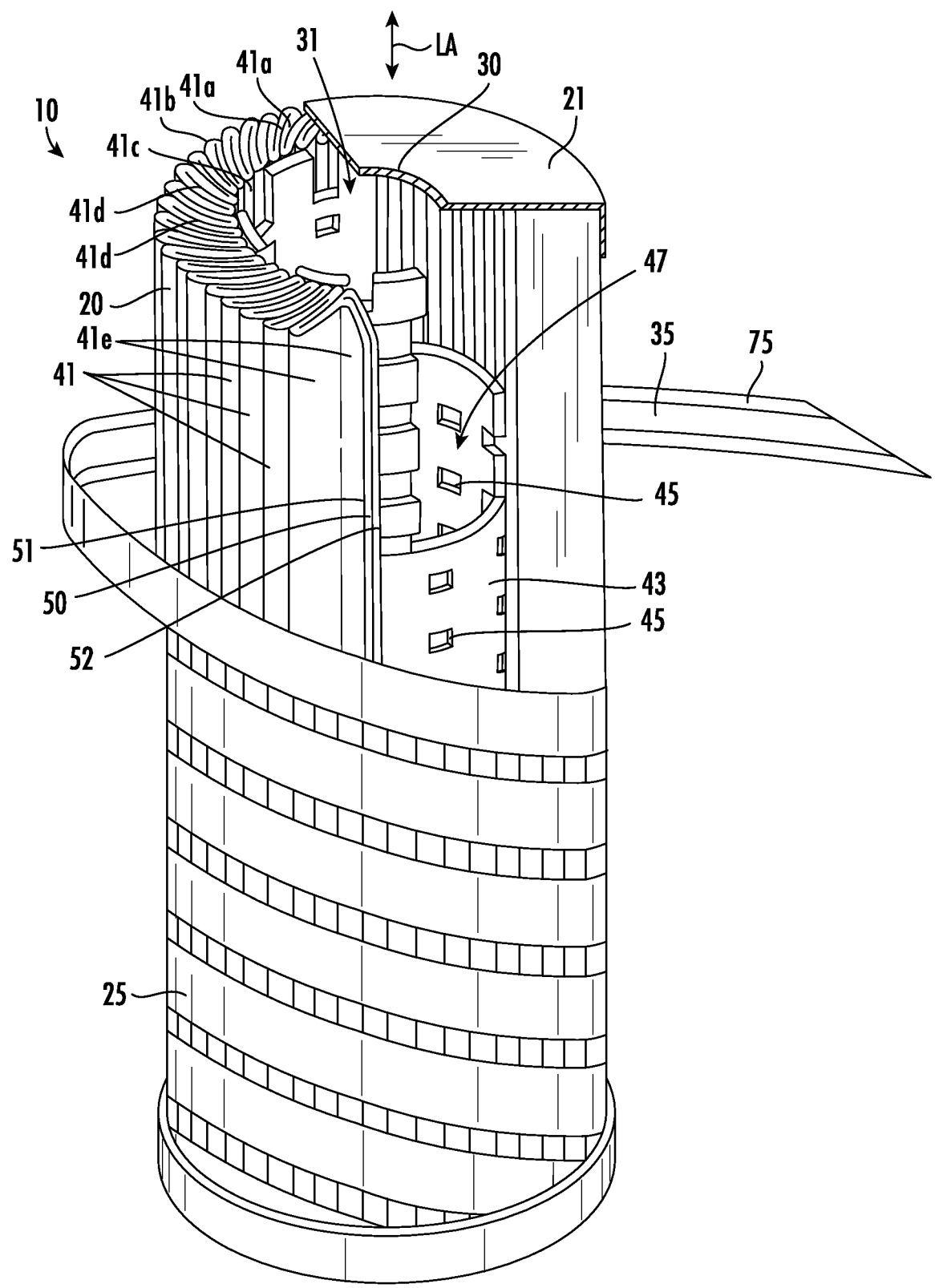
FIG. 2 is a perspective view of another embodiment of a filter constructed in accordance with principles of the present disclosure, wherein one of the end caps is partially cut away to show the interior of the filter.

As shown in FIG. 2, in embodiments, the filter element 20 includes a cylindrical core 43 is coaxially disposed within the interior passage 31. The core 43 defines a plurality of openings 45 disposed in spaced relationship to each other in a regular pattern to permit the passage of a fluid stream either radially outward from an axial central bore 47 of the core 43 or radially inward from the outside of the core 43 to the central bore 47. In embodiments, the core 43 can have any suitable construction, including being of conventional design and being made of any material having sufficient strength for the intended application and being compatible with the fluid intended to be filtered, as will be appreciated by one skilled in the art.

When the filter element 20 is subjected to radially inward fluid flow, the presence of the core 43 is usually desirable because the core 43 supports the inner periphery of the filter element 20 against forces in the radial direction to maintain the configuration of the filter element 20 and also helps to give the filter 10 strength and rigidity against bending. Alternatively, when the filter element 20 is subject to radially outward (inside to outside) fluid flow, the core 43 may be omitted, enabling a reduction in the weight and cost of the filter.

Referring to FIG. 1, in embodiments of a filter constructed according to principles of the present disclosure, the filter 10 is equipped with end caps 21, 22 at one or both of the axial ends 27, 28 of the filter element 20. The end caps 21, 22 can be either blind or open end caps, and can be made of a material which is suitable for the filter conditions and the other materials of the filter components to which the end caps 21, 22 are to be joined. In embodiments, the end caps 21, 22 are attached to the filter element 20. Conventional techniques can be used to attach the end caps 21, 22 to the filter element 20, such as, by polycapping or spin welding, or by using an epoxy, for example.

Referring to FIG. 2, the filter element 20 includes a plurality of pleats 41 (only a few of which are designated in FIG. 2) arranged in close contact with each other to define the cylindrical shape of the filter element 20. Each of the pleats 41 of the filter element 20 has a pair legs 41*a* which are joined to one another: (1) at the crown or crest 41*b* of the outer periphery of the filter element 20, and (2) to a leg 41*a* of an adjacent pleat 41 at the root 41*c* of the inner periphery of the filter element 20. Each leg 41*a* has an internal surface 41*d* which opposes the internal surface 41*d* of the other leg 41*a* in the same pleat 41. Each leg 41*a* also has an external surface 41*e* which opposes the external surface 41*e* of a leg 41*a* of an adjacent pleat 41.

The opposing internal surfaces 41*d* of the legs 41*a* of each pleat 41 contact each other over substantially the entire height of the legs 41*a* and of the pleat 41 and over a continuous region extending for at least a major portion of the axial length of the filter element 20 along the longitudinal axis LA. In addition, the opposing external surfaces 41*e* of the legs 41*a* of adjacent pleats 41 contact each other over substantially the entire height of the adjacent pleats 41 and legs 41*a* and over a continuous region extending for at least a major portion of the axial length of the filter element 20 along the longitudinal axis LA. The height of the pleats 41 and the legs 41*a* is measured in a direction along the surfaces of the legs 41*a* and extends from the inner periphery to the outer periphery of the filter element 20.

When the filter element 20 is being used such that fluid flows radially inwardly through the element 10, the external surfaces 41*e* form the upstream surface of the filter element 20, while the internal surfaces 41*d* of the legs 41*a* form the downstream surface of the filter element 20. When the filter element 20 is subjected to radially outward fluid flow, the internal surfaces 41*d* of the legs 41*a* form the upstream surface of the filter element 20, while the external surfaces 41*e* form the downstream surface of the filter element 20.

The curved pleat configuration shown in FIGS. 1-2 permits uniform pleat support and acts to distribute concentrated loads evenly across the filter element 20, thereby reducing pleat movement and increasing the ability of the pleats to retain particles in pulsating flow systems. Those skilled in the art will appreciate that, in embodiments, the filter element 20 can comprise curved or laid-over pleats (as illustrated in FIG. 2) or conventional radial pleats (not shown). In embodiments, the pleat legs 41*a* have equal length legs. In other embodiments, especially when the filter element 20 is formed from a multilayer composite, the pleat legs 41*a* can have slightly different lengths or unequal length legs.

Referring to FIG. 2, in embodiments, the filter element 20 includes a filter medium 50 and drainage means disposed on at least one side, preferably the intended upstream side, and more preferably on both the upstream and downstream sides of the filter medium 50 as will be appreciated by one skilled in the art. In embodiments, the opposing surfaces of the curved pleats 41 are pressed into contact with each other. Consequently, the strands of the drainage mesh of each leg 41*a* of the pleats 41 are pressed against the strands of the drainage mesh of an adjacent leg 41*a* of the pleats 41. The drainage means prevents opposing surfaces of the filter medium 50 from coming into contact with one another and enables fluid to evenly flow to or from substantially all portions of the surface of the filter medium 50 when curved pleats 41 are used in the filter element. Thus, virtually the entire surface area of the filter medium 50 may be effectively used for filtration. When radial pleats are used in the filter element 20, sufficient space typically exists between the upstream and downstream sides of the pleat legs so that fluid may evenly flow to or from substantially all portions of the surface of the filter medium 50.

In the embodiment of FIG. 2, the filter element 20 comprises a three-layer composite of a filter medium 50, drainage means in the form of a first drainage layer 51 disposed on the outer side of the filter medium 50, and drainage means in the form of a second drainage layer 52 disposed on the inner side of the filter medium 50. Here, the outer surface and the inner surface of the filter medium refer to the upstream and downstream surfaces, respectively, when the filter 10 is subjected to radially inward fluid flow. When the filter 10 is subjected to radially outward fluid flow, the upstream and downstream surfaces are reversed. The layers forming the filter element 20 can be formed into a composite by conventional filter manufacturing techniques, either prior to or simultaneously with corrugation.

The drainage layers 51, 52 can comprise any suitable material as known to one skilled in the art. In embodiments, at least one of the first drainage layer 51 and the second drainage layer 52 may comprise a polymeric mesh or an extruded or woven polymeric mesh.

In embodiments, any suitable filter medium can be employed in a filter constructed according to principles of the present disclosure, and it can be selected in accordance with the fluid which is intended to be filtered and the desired filtering characteristics. The filter medium 50 can be used to filter a variety of fluid streams, such as, liquids, gases, or mixtures thereof.

In embodiments, the filter medium 50 can comprise a membrane, a porous film or a fibrous sheet or mass; it may have a uniform or graded pore structure and any appropriate effective pore size. The filter medium 50 can be formed from any suitable material, such as a natural or synthetic polymer, glass, or metal. The filter medium 50 may comprise a single layer, or the filter medium 50 may comprise a plurality of layers of the same medium disposed atop one another to a desired thickness. Furthermore, it is possible for the filter medium 50 to include two or more layers having different filtering characteristics, e.g., with one layer acting as a prefilter for the second layer. In another embodiment, the filter element 20 may comprise several integral regions, including a single, unitary porous sheet having a finely-pored center region, which serves as a filter medium, and coarsely-pored upstream and/or downstream regions which serve as the drainage layers.

In embodiments, the first and second drainage layers 51, 52 are distinct layers separate from the filter medium 50. The first and second drainage layers 51, 52 can be of the same or different construction. The first and second drainage layers 51, 52 can be made of any materials having suitable edgewise flow characteristics, i.e., suitable resistance to fluid flow through the layer in a direction parallel to its surface. The edgewise flow resistance of each of the drainage layers 51, 52 is preferably low enough that the pressure drop in the drainage layer 51, 52 is less than the pressure drop across the filter medium 50, thereby providing an even distribution of fluid along the surface of the filter medium 50. In embodiments, the drainage layers 51, 52 can be in the form of a mesh or screen or a porous woven or non-woven sheet.

Meshes are particularly suitable as drainage layers when the filter medium 50 is a fibrous laid-down medium. On the other hand, when the filter medium 50 is a membrane, a woven or non-woven fabric may be more suitable for use as the drainage layer(s) 51, 52 because a fabric is usually smoother than a mesh and produces less abrasion of adjoining layers of the filter composite.

In embodiments, the filter composite forming the filter element 20 may include other layers in addition to the filter medium 50 and the drainage layer(s) 51, 52. For example, in order to prevent abrasion of the filter medium 50 due to rubbing contact with the drainage layers 51, 52 when the pleats expand and contract during pressure fluctuations of the fluid system in which the filter 10 is installed, a cushioning layer can be disposed between the filter medium 50 and one or both of the drainage layers 51, 52. The cushioning layer is preferably made of a material smoother than the drainage layers 51, 52 and having a higher resistance to abrasion than the filter medium 50. For example, when the drainage layers 51, 52 are made of an extruded nylon mesh, an example of a suitable cushioning layer is a polyester non-woven fabric.

Advantageously, the filter medium 50 can be constructed such that it is electrically non-conductive and used to filter particulates from a non-conductive fluid stream. The wrap 25 can be used to reduce triboelectric charge build up. In embodiments, the filter medium 50 is made from any suitable electrically non-conductive material. In embodiments, the filter medium 50 can comprise a hydrophilic material. In embodiments, the filter medium 50 can comprise electrically non-conductive fibers made of a suitable material, such as glass, ceramic polyester, cellulose, rayon, and polypropylene, for example. For example, in embodiments, the filter medium 50 comprises at least ninety-nine percent glass fiber by weight, and consists essentially of glass fiber in yet other embodiments.

In embodiments, the filter medium 50 is constructed to have a relatively high basis weight relative to conventional conductive media. High basis weight media has high specific surface area (square meter surface per square feet of media) which helps achieve high dirt capacity per square feet of media. For example, in embodiments, the filter medium 50 has a basis weight of at least 3 grams per square foot (gpsf). In other embodiments, the filter medium 50 has a basis weight of at least 3.5 gpsf, and at least 4 gpsf in yet other embodiments.

In embodiments, the filter medium 50 has a specific surface area of at least 4 $m^2/ft^2$. In embodiments, the filter medium 50 has a specific surface area of at least 5 $m^2/ft^2$, and at least 6 $m^2/ft^2$ in yet other embodiments.

Referring to FIG. 1, the wrap 25 comprises the conductive layer 35 which comprises an electrically-conductive material. In embodiments, the conductive layer 35 of the wrap 25 can be made from any suitable, electrically-conductive material. For example, in embodiments, the electrically-conductive material of the conductive layer 35 comprises a permeable nonwoven nylon impregnated with at least one of carbon and an electrically-conductive polymer. In other embodiments, the electrically-conductive material of the conductive layer 35 comprises an electrically-conductive metal.

The wrap 25 comprises a strip having parallel sides 71, 72, a wrap length L (measured along an axis parallel to the sides 71, 72) and a wrap width W (measured laterally along an axis transverse to the sides 71, 72) where the wrap length L is greater than the wrap width W. The illustrated wrap 25 comprises a parallel-sided strip of flexible material which is helically wrapped about the filter element 20 in a plurality of windings. In embodiments in which the wrap 25 completely envelops the outer periphery of the filter element 20, the wrap 25 is preferably permeable. While the filter element 20 preferably comprises pleats, the wrap 25 can be used in other embodiments with non-pleated filter packs, such as, a hollow cylindrical mass of fibers, for example.

In embodiments, the wrap 25 is made from porous material. In embodiments, the wrap 25 can be made of suitable material which is compatible with the fluid being filtered. In embodiments, the wrap 25 is made of a material sufficiently strong enough to provide sufficient support against radially outward forces and resist the stresses resulting from inside-to-outside flow. The tension of the wrap 25 can be selected in accordance with the expected filtering conditions.

In embodiments, the wrap 25 is secured to at least the filter element 20. In embodiments, the wrap 25 can be secured to the filter element 20 via any suitable technique, as will be appreciated by one skilled in the art. In embodiments, the wrap 25 is bonded to the filter element 20 via an adhesive or mechanical bond such that the wrap 25 is in contacting arrangement therewith and is fixed in place. The wrap 25 is preferably secured in a manner which prevents it from becoming unwound from the filter element 20. In embodiments, the wrap can be constructed to be attached to at least one of the end caps 21, 22 and to resist radially outward forces generated by a pressure drop across the filter element.

In embodiments, the wrap 25 may be attached to the outer surface 32 of the filter element 20 by applying a bead of hot melt adhesive on both longitudinally-extending sides 71, 72 of the wrap 25. On each side 71, 72, the hot melt adhesive may flow into the porous sides 71, 72.

In embodiments, the wrap 25 is attached at its ends to a respective one of the end caps 21, 22. In embodiments where the wrap 25 is attached to at least one of the end caps 21, 22, the wrap 25 is preferably inserted at least 50 thousandths of an inch into the associated end cap 21, 22, and more preferably at least 100 thousandths of an inch into the end cap 21, 22. In embodiments, before the wrap 25 is attached to the end cap 21, 22, the axial ends of the wrap 25 are cut at angle so that substantially the entire cut end may be inserted into the end cap 21, 22 and bonded thereto.

In embodiments, the wrap 25 is wrapped around the filter element 20 in such a way as to provide a sufficient conductive surface area provided by the conductive layer 35 to efficiently interact with the fluid stream being filtered to dissipate triboelectric charge. In embodiments, the wrap 25 is wrapped around the filter element 20 such that at least forty percent of the outer cylindrical surface area 38 is covered by the conductive layer 35. In other embodiments, the wrap 25 is wrapped around the filter element 20 such that at least fifty percent of the outer cylindrical surface area 38 is covered by the conductive layer 35.

In the illustrated embodiment, the wrap 25 is helically wrapped around the filter element 20 to form a plurality of helical windings along the longitudinal axis LA. The helical windings are in spaced relationship to each other to define a gap G between adjacent helical windings. The wrap 25 is helically wrapped around the filter element 20 along a helix angle γ. In embodiments, the helix angle γ is non-parallel to a transverse plane T perpendicular to the longitudinal axis LA. In embodiments, the wrap 25 is helically wrapped around the filter element 20 to form a plurality of adjacent windings under tension to help hold the filter element 20 in a cylindrical configuration.

In embodiments, the wrap 25 can be wrapped around the filter element 20 with or without overlap between adjacent windings of the wrap 25. For example, adjacent windings of a permeable wrap 25 can abut each other with substantially no overlap, or by employing an overlap, it is possible to wrap multiple layers of a permeable wrap 25 around the filter element 20. In embodiments, the wrap 25 can define openings therethrough to increase permeability.

Referring to FIG. 2, in embodiments, the conductive layer 35 is configured to provide an electrical current pathway for dissipating triboelectric charge in an efficient manner. The provision of the conductive layer 35 can allow the filter 10 to filter a fluid stream having a conductivity less than 50 pS/m via a filter element 20 with a nonconductive filter medium 50 that has relatively high specific surface area. High specific surface area would typically not be desired in applications with triboelectric charging as it would be expected to lead to more charge build up and ultimately electrostatic discharge. In embodiments, the conductive layer 35 has a sheet resistance less than 50 kΩ/sq. (ohms per square). In other embodiments, the conductive layer 35 has a sheet resistance less than 45 kΩ/sq., and less than 40 kΩ/sq. in still other embodiments.

In embodiments, the wrap 25 can comprise, consist essentially of, or consist of the conductive layer 35. In embodiments, the wrap 25 can have a multi-layer construction.

For example, in the embodiment illustrated in FIGS. 1 and 2, the wrap 25 comprises the conductive layer 35 and a carrier layer 75. The wrap 25 can be secured to the filter element 2 such that the conductive layer 35 is disposed toward the outer surface 32 of the filter element 20 and the carrier layer is disposed outwardly relative to the conductive layer 35.

In embodiments, the carrier layer 75 is connected to the filter element 20 to resist radially outward expansion of the filter element 20. In embodiments, the carrier layer 75 has a grab tensile strength of at least 90N along the wrap length L.

Figure 3:
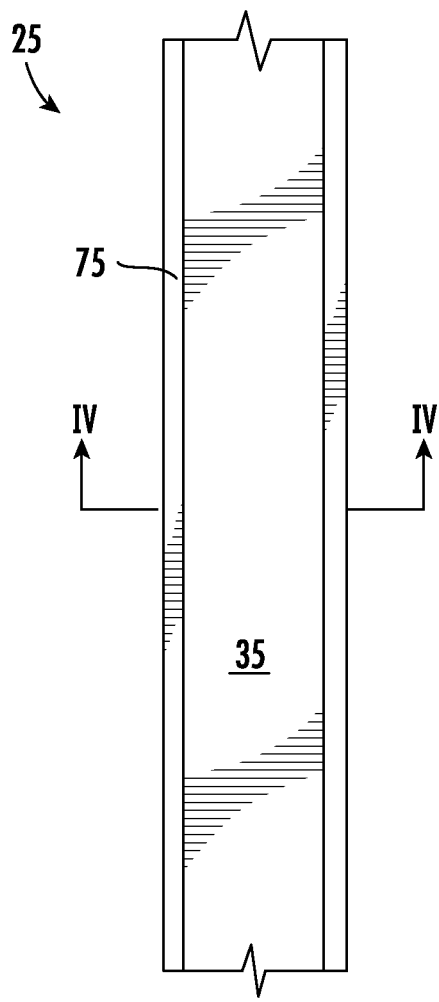
FIG. 3 is a plan view of an embodiment of a multi-layer wrap constructed in accordance with principles of the present disclosure and suitable for use in embodiments of a filter constructed in accordance with principles of the present disclosure.
Figure 4:
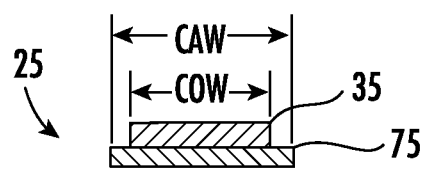
FIG. 4 is a cross-sectional view take along line IV-IV in FIG. 3.

Referring to FIGS. 3 and 4, the wrap 25 used in the filter 10 of FIGS. 1 and 2 is shown. The wrap 25 comprises an embodiment of a wrap constructed according to principles of the present disclosure. The wrap 25 is suitable for use in embodiments of a filter 10 constructed according to principles of the present disclosure.

In embodiments, the conductive layer 35 is secured to the carrier layer 75. In embodiments, any suitable technique can be used to secure the conductive layer 35 to the carrier layer 75. For example, in embodiments, the conductive layer 35 is secured to the carrier layer 75 by being ultrasonically, thermally, or adhesively bonded thereto. In embodiments, the conductive layer 35 is secured to the carrier layer 75 by applying a double-sided adhesive tape applied between the conductive layer 35 and the carrier layer 75; applying a hot melt adhesive, such as, e.g., polyamide hot melt or EVA hot melt, between the conductive layer 35 and the carrier layer 75; or by ultrasonically spot welding the conductive layer 35 and the carrier layer 75.

In the illustrated embodiment, the conductive layer 35 has a conductive layer width COW, and the carrier layer 75 has a carrier layer width CAW which is greater than the conductive layer width COW. In embodiments, the conductive layer width COW is equal to or less than the carrier layer width CAW.

In embodiments, the conductive layer 35 is secured to the carrier layer 75 such that the conductive layer 35 is disposed laterally within, or aligned with, the carrier layer. In embodiments, the conductive layer width COW is in a range between: (1) half the carrier layer width CAW and (2) the carrier layer width CAW. In the illustrated embodiment, the conductive layer 35 is narrower than the carrier layer 75 and is disposed laterally within the carrier layer 75.

In embodiments, the carrier layer 75 can be made from any suitable material. For example, in embodiments, the carrier layer 75 may be formed from a suitable, spun bonded thermoplastic material which is compatible with the fluid being filtered, and which will readily bond to an adhesive such as a hot melt adhesive. The carrier layer 75 is preferably porous, allowing the hot melt adhesive to penetrate within the carrier layer 75 to form a stronger bond. In embodiments, the carrier layer 75 is perforated to enhance its permeability.

In embodiments, the carrier layer 75 can comprise, consist essentially of, or consist of electrically nonconductive material. For example, in embodiments, the material of the carrier layer 75 comprises, consists essentially of, or consists of a permeable nonwoven polyester or nylon.

In embodiments, the carrier layer 75 comprises a material different from the electrically-conductive material of the conductive layer 35. For example, in embodiments, the conductive layer 35 comprises a commercially-available conductive material available from Cerex Advanced Fabrics, Inc. of Cantoment, Florida, such as Nystat™ 50 conductive nylon material, for example, and the carrier layer 75 comprises a different commercially-available material, such as, at least one of the following: a commercially-available polyester material available from Fiberweb, Inc. of Old Hickory, Tennessee, under the trademark Reemay®, such as Grades 2016, 2024, or 2033, for example, and a commercially-available nylon available from Cerex Advanced Fabrics, Inc. of Cantoment, Florida, such as Cerex® Grades 70, 85, 100, or 150, for example.

The multi-layer wrap 25 can be made using any suitable technique as will be appreciated by one skilled in the art. For example, in embodiments, the multi-layer wrap 25 is made by bonding via ultrasonic point bonding a conductive layer 35 in the form of a conductive scrim made from an impregnated nylon with a sheet resistance less than 50 kΩ/sq. to a suitable carrier layer 75 made from a polyester spunbond having a grab tensile strength of at least 90N in the machine direction.

In embodiments, the conductive layer 35 can have other strip-like configurations. For example, in other embodiments, the two-layer wrap 25 can be made by wet laying metal fibers such as stainless steel or copper and a binder to form the conductive layer 35 onto the carrier layer 75. In yet other embodiments, the two-layer wrap 25 is made by bonding a conductive layer 35 in the form of a wire or wire mesh to the carrier layer 75 with an adhesive. In still other embodiments, the two-layer wrap 25 is made by needle punching a conductive layer 35 in the form of a mat of conductive fibers together with the carrier layer 75.

Figure 5:
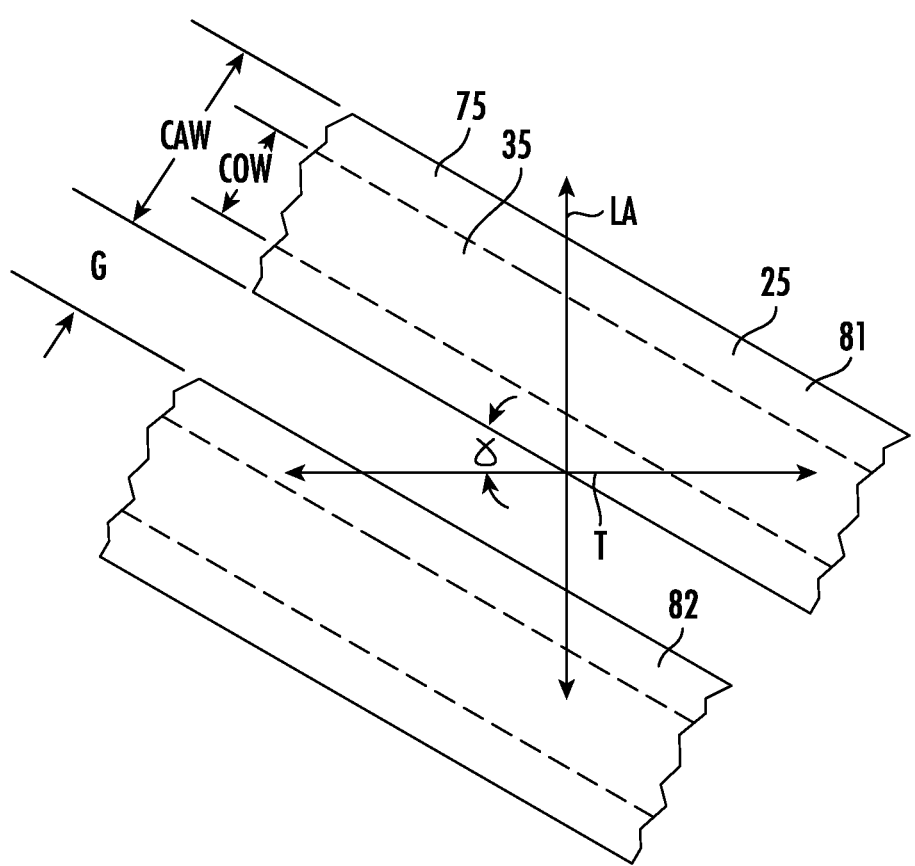
FIG. 5 is a plan view of two adjacent windings of a wrap suitable for use in embodiments of a filter constructed in accordance with principles of the present disclosure, illustrating a preferred exemplary embodiment of a layout of the wrap.

Referring to FIG. 5, in embodiments, the wrap 25 is helically wrapped around the filter element 20 to form a plurality of helical windings 81, 82 along the longitudinal axis LA. The helical windings 81, 82 are in spaced relationship to each other to define a gap G between adjacent helical windings 81, 82. The wrap 25 is helically wrapped around the filter element 20 along a helix angle γ that is non-parallel to a transverse plane T perpendicular to the longitudinal axis LA. The adjacent windings 81, 82 of the wrap 25 have a gap width G measured along an axis perpendicular to the helix angle γ. In embodiments, the conductive layer width COW is greater than forty percent of the sum of the conductive layer width CAW and the gap width G. In embodiments, the pitch between adjacent windings 81, 82 of the wrap 25 is configured such that the conductive layer width COW of the conductive layer 35 is at least forty percent of the carrier layer width CAW of the carrier layer 75 plus the gap G between adjacent windings 81, 82 (COW≥0.4×(CAW+G)).

In an embodiments, the multi-layer wrap 25 includes a conductive layer 35, which comprises Nystat™ 50 conductive nylon and has a conductive layer width COW of one inch, and a carrier layer 75, which comprises non-conductive Reemay® 2033 polyester and has a carrier layer width CAW of 1.35 inches. The conductive layer 35 can be mounted to the carrier layer 75 so that the conductive layer 35 is laterally centered within the carrier layer 75. The two layers 35, 75 can be welded together with thermal welds 0.125 inches long over the width of the two layers 35, 75 where the welds are repeated in spaced relationship between six and twelve inches apart along the length L. The wrap 25 can be wound helically around the filter element 20 such that gap G between adjacent windings is 0.75 inches so that coverage of the conductive layer 35 over the outer cylindrical surface area 38 is 47.6% (COW/(CAW+G)=1/(1.35+0.75)=0.476)

Figure 6:
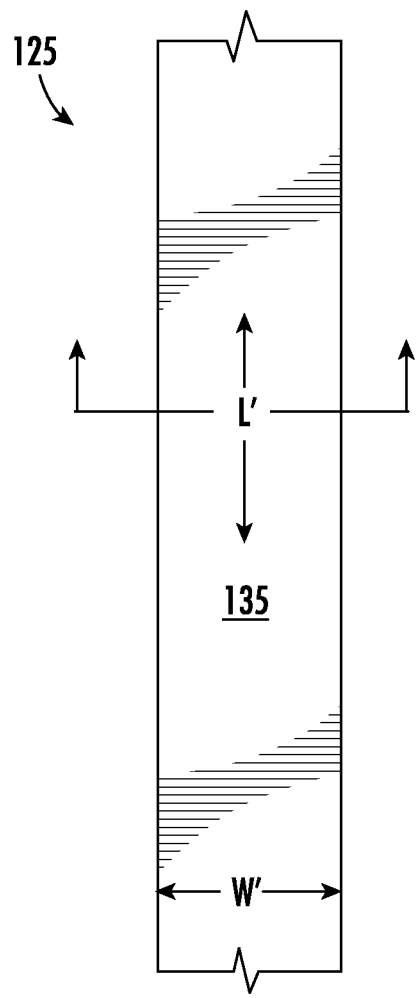
FIG. 6 is a plan view of an embodiment of a single-layer wrap constructed in accordance with principles of the present disclosure and suitable for use in embodiments of a filter constructed in accordance with principles of the present disclosure.
Figure 7:
FIG. 7 is a cross-sectional view take along line VII-VII in FIG. 6.

Referring to FIGS. 6 and 7, an embodiment of a wrap 125 constructed according to principles of the present disclosure is shown. The wrap 125 is suitable for use in embodiments of a filter constructed according to principles of the present disclosure. The wrap 125 consists of the conductive layer 135. In embodiments, the conductive layer 35 has a grab tensile strength of at least 90N along the wrap length L'. In embodiments, a wrap 125 consisting of a conductive layer 135 can be made from any suitable material. For example, in embodiments, the conductive layer 135 can be made from carbon impregnated nylon spun bond having a basis weight of about 55 g/m².

In embodiments, the wrap 125 consisting of the conductive layer 135 can be helically wound around the filter element. In embodiments, the pitch between the windings of the wrap 125 is such that the wrap width W' is greater than forty percent the sum of the wrap width W' and the gap G between windings.

A filter element 20 suitable for use in embodiments of a filter constructed according to principles of the present disclosure can be manufactured by a variety of techniques. In one technique, the filter composite including suitable filter media, support, and drainage is first corrugated to form a corrugated sheet, cut to a suitable length or suitable number of pleats, and then formed into a cylindrical shape. The lengthwise edges of the corrugated sheet are then sealed to each other by conventional means to form a filter pack. For example, the two ends of the corrugated filter pack can be sealed using an ultrasonic sealing welding system.

The wrap 25 can be helically wrapped around the length of the filter packs. The tension applied to the wrap 25 can be sufficient to prevent movement of the pleats 41 or ripples in the wrap 25 between the pleats 41, without crushing or closing off the pleats 41 of the filter pack. In embodiments, a gap is formed between adjacent windings of the helical wrap 25 so that at least forty percent of the outer surface area of the filter element is covered by the conductive layer 35. The filter pack may be manufactured in desired lengths (e.g., 42-44 inches), and the wrap 25 can be applied to the entire length. In embodiments, the wrap can be applied circumferentially in bands (parallel to the plane transverse to the longitudinal axis of the filter pack) that are in regular spaced relationship to each other.

The wrap 25 can be attached directly to the filter pack. In embodiments, the wrap 25 is attached to the filter element 20 by a bonding agent, such a hot melt adhesive, which is applied to the wrap 25 as it is wound around the filter element 20. The bonding agent can be applied to the wrap 25 in the form of a continuous or intermittent bead which spirals around the filter element 20 parallel to the edges of the wrap 25. In other embodiments, the wrap 25 is fusion bonded to the filter element 20 by a hot wheel which travels down the length of the filter element 20 as the filter element 20 is rotated.

In embodiments, a two-layer wrap 25 is used to wrap the filter element 20. The layers of the wrap 25 are bonded together and are each 1.35" wide. The wrap 25 is wrapped helically around filter element with a gap of 0.75" between adjacent windings. The wrap 25 is bonded to the filter element 20 via a hot melt adhesive.

In embodiments, it will be appreciated that the carrier layer 75 is wider than the conductive layer 35. Thus, when the wrap 25 is bonded into the end caps 21, 22, the carrier layer 75 can help prevent the conductive layer 35 from separating from the end caps 21, 22 and the filter pack. The carrier layer 75 can be made from materials capable of enhanced bonding to the adhesives and potting materials used in manufacturing the filter elements. The wider carrier layer 75 can be configured to provide better handling and performance during the manufacturing process, and reduce the occurrence of separation between the conductive layer 35 and the end caps 21, 22 and the filter pack, while maintaining the conductivity characteristics of the conductive layer 56. The wider carrier layer 75 can also keep the spread of the adhesive within the periphery of the wrap 25 and reduce the undesirable mess which may occur if the adhesive spreads outside the wrap periphery.

Thereafter, the combined wrap and filter pack can be cut to a desired length. In embodiments, the combined wrap and filter pack can be cut in lengths of, for example, 40 inches, 20 inches, 13 inches, 8 inches, or 4 inches.

After the combined filter pack and wrap is cut to the desired length, it can be end capped to form the filter element 20. In embodiments, the combined filter pack and wrap is capped with an open adapter on one end of the filter pack and a close adapter on the other end.

The end caps 21, 22 can be applied using a suitable potting compound, including, for example, an epoxy, a polyurethane, or a hot melt adhesive. The end caps 21, 22 can be made from metal or polymeric. In embodiments, a polymeric end cap can be applied to the end of the filter element 20 by melting a portion of the polymeric end cap and inserting the end of the filter element 20 into the molten portion of the end cap 21, 22. In either case, the end of the filter element 20 preferably should be inserted preferably at least 50 thousandths of an inch, and more preferably about 100 thousandths of an inch, into the potting compound or the molten plastic to ensure the wrap 25 is properly bonded to the filter element at the end caps 21, 22.

Figure 8:
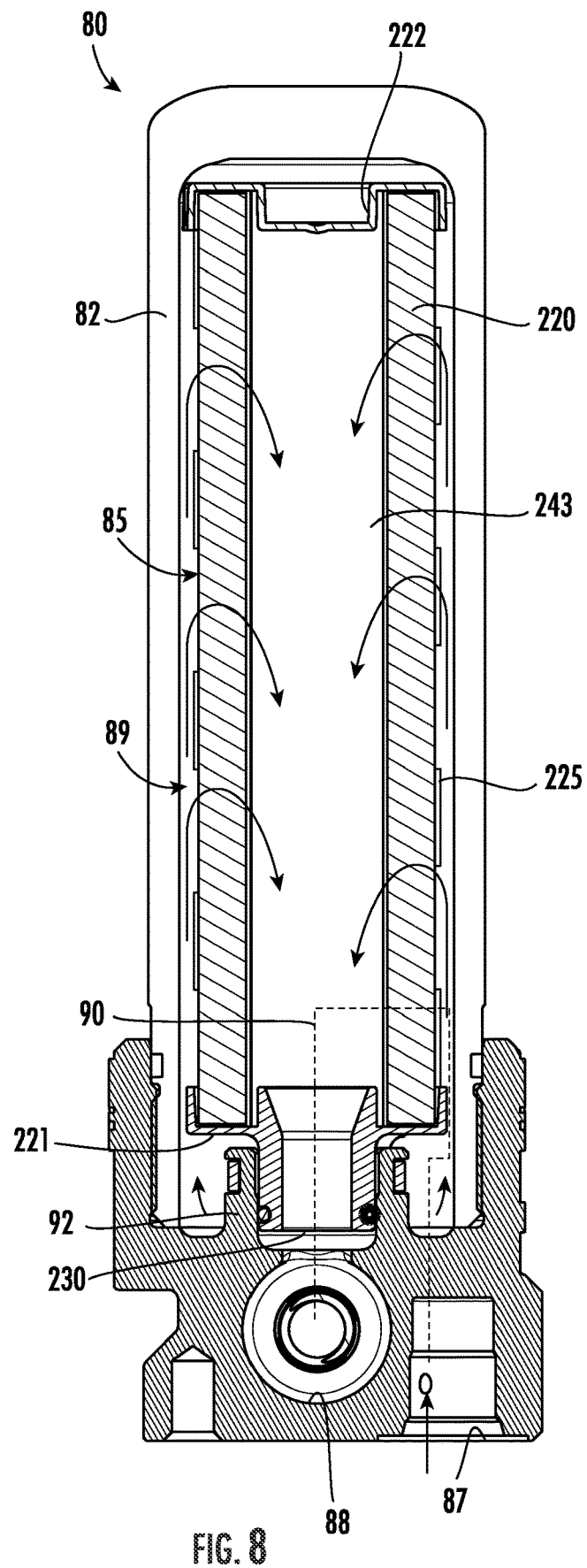
FIG. 8 is a side elevational view, partially in section, of an embodiment of a fluid filter assembly for filtering particulates from a fluid stream constructed according to principles of the present disclosure.

Referring to FIG. 8, an embodiment of a fluid filter assembly 80 for filtering particulates from a fluid stream constructed according to principles of the present disclosure is shown. The fluid filter assembly 80 includes a housing 82 and an embodiment of a filter 85 constructed according to principles of the present disclosure. In embodiments, a fluid filter assembly 80 for filtering particulates from a fluid stream constructed according to principles of the present disclosure can include any embodiment of a filter constructed according to principles of the present disclosure.

In embodiments, the housing 82 defines a first port 87, a second port 88, and a filter chamber 89. The first port 87 and the second port 88 are in communication with the filter chamber 89 such that a fluid flow path 90 is defined between the first port 87 and the second port 88 through the filter chamber 89. In the illustrated embodiment, the filter 85 is similar in construction to the embodiment illustrated in FIGS. 1 and 2. In other embodiments, another embodiment of a filter constructed according to principles of the present disclosure can be used.

The filter 85 includes a filter element 220, a first end cap 221, a second end 222, and a wrap 225. In embodiments, the filter element 220 includes a filter medium made from electrically non-conductive material.

The first end cap 221 and the second end cap 222 are respectively secured to the first end and the second end of the filter element 220 to form a fluid tight seal therebetween. In embodiments, at least one of the first end cap 221 and the second end cap 222 defines an opening 230 therethrough in fluid communication with the interior passage of the filter element.

The wrap 225 is secured to at least the filter element 220. The wrap 225 comprises a conductive layer comprising an electrically-conductive material. The wrap 225 is wrapped around the filter element 220 such that at least forty percent of the outer surface area of the filter element 220 is covered by the conductive layer. In embodiments, the wrap 225 can be similar in other respects to other embodiments of a wrap including a conductive layer as discussed above.

The filter 85 is positioned within the filter chamber 89 of the housing 82 such that the filter 85 is interposed between the first port 87 and the second port 88 along the fluid flow path and such that the filter element 220 is electrically connected to the housing 82. The filter 85 can be electrically connected to ground by way of the connection of the housing 82 and piping thereto. In embodiments, the electrical ground comprises an earth ground, but, in other embodiments, can comprise a floating or chassis ground, as will be appreciated by one skilled in the art. In embodiments, the first end cap 221 and the core 243 can be made from an electrically conductive material. In the illustrated embodiment, the core 243 of the filter element 220 (the openings of which are not shown in FIG. 8 for simplification of illustration) and the wrap 229 are in electrical contact with a seat 92 in the housing 82 via the first end cap 221.

In embodiments in which the filter 85 does not include a core, the housing 82 can include a fixed core piece. The wrap of the filter element of a coreless filter can be placed in electrical contact with the core piece of the housing 82 to ground the filter 85 via any suitable technique such as through at least one end cap made from an electrically conductive material.

Embodiments of a filter constructed according to principles of the present disclosure can be used to carry out a method of filtering particulates from a fluid stream following principles of the present disclosure as described above. In embodiments, a method using a filter following principles of the present disclosure can be used with any embodiment of a filter constructed according to principles discussed herein.

In embodiments, a method of filtering particulates from a fluid stream includes passing the fluid stream through a filter element where the fluid stream has a conductivity less than 50 pS/m. The filter element is cylindrical and extends along a longitudinal axis between a first end and a second end. The filter element has an inner surface defining an interior passage and an outer surface defining an outer cylindrical surface area.

A wrap is electrically connected to ground. The wrap is secured to at least the filter element. The wrap comprises a strip having a wrap length and a wrap width. The wrap length is greater than the wrap width. The wrap comprises a conductive layer comprising an electrically-conductive material. The wrap is wrapped around the filter element such that at least forty percent of the outer cylindrical surface area is covered by the conductive layer.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A filter for filtering particulates from a fluid stream, the filter comprising:
   a non-conductive filter element, the filter element extending along a longitudinal axis between a first end and a second end, the filter element having an inner surface defining an interior passage and an outer surface defining an outer surface area, the filter element including a filter medium made from electrically non-conductive material;
   a first end cap and a second end cap, the first end cap and the second end cap respectively secured to the first end and the second end of the filter element to form a fluid tight seal therebetween, wherein at least one of the first end cap and the second end cap defines an opening therethrough in fluid communication with the interior passage of the filter element; and
   a wrap, the wrap secured to at least the filter element, the wrap comprising a strip having a wrap length and a wrap width, the wrap length being greater than the wrap width,
   wherein the wrap comprises a conductive layer comprising an electrically-conductive material and a carrier layer made from a material different from the electrically-conductive material, the conductive layer being secured to the carrier layer, the conductive layer has a conductive layer width, and the carrier layer has a carrier layer width, the conductive layer width being equal to or less than the carrier layer width, the conductive layer being secured to the carrier layer such that the conductive layer is disposed laterally within, or aligned with, the carrier layer, and
   wherein the wrap is helically wrapped around the filter element to form a plurality of helical windings along the longitudinal axis such that at least forty percent of the outer surface area is covered by the conductive layer,
   wherein the helical windings are in spaced relationship to each other to define a gap between adjacent helical windings, the wrap being helically wrapped around the filter element along a helix angle, the helix angle being non-parallel to a transverse plane perpendicular to the longitudinal axis, the gap having a gap width measured along an axis perpendicular to the helix angle, and wherein the conductive layer width is greater than forty percent of the sum of the conductive layer width and the gap width.

2. The filter according to claim 1, wherein the conductive layer has a sheet resistance less than 50 kΩ/sq.

3. The filter according to claim 2, wherein the conductive layer has a grab tensile strength of at least 90N along the wrap length.

4. The filter according to claim 2, wherein the electrically-conductive material of the conductive layer comprises a permeable nonwoven nylon impregnated with at least one of carbon and an electrically-conductive polymer.

5. The filter according to claim 2, wherein the electrically-conductive material of the conductive layer comprises an electrically-conductive metal.

6. The filter according to claim 1, wherein the conductive layer width is in a range between: (1) half the carrier layer width and (2) the carrier layer width.

7. The filter according to claim 1, wherein the carrier layer is connected to the filter element to resist radially outward expansion of the filter element, and the carrier layer has a grab tensile strength of at least 90N along the wrap length.

8. The filter according to claim 1, wherein the material of the carrier layer comprises a permeable nonwoven polyester.

9. The filter according to claim 8, wherein the electrically-conductive material of the conductive layer comprises a permeable spunbonded nylon impregnated with at least one of carbon and an electrically-conductive polymer.

10. The filter according to claim 1, the filter medium comprises at least ninety-nine percent glass fiber by weight.

11. The filter according to claim 1, wherein the filter medium has a basis weight of at least 3 gpsf and a specific surface area of at least 4 $m^2/ft^2$.

12. The filter according to claim 11, wherein the filter medium has a first side and a second side, and wherein the filter element includes a first drainage layer disposed on the first side of the filter medium and a second drainage layer disposed on the second side of the filter medium, wherein at least one of the first drainage layer and the second drainage layer comprises a polymeric mesh.

* * * * *